United States Patent [19]
Sherman, Jr.

[11] Patent Number: 5,816,181
[45] Date of Patent: Oct. 6, 1998

[54] BALLAST WATER TREATMENT SYSTEM

[76] Inventor: Thomas W. Sherman, Jr., 2 Devonshire Court, Apt. 9, Michigan City, Ind. 46360

[21] Appl. No.: 798,641

[22] Filed: Feb. 11, 1997

Related U.S. Application Data

[60] Provisional application No. 60/011,673 Feb. 14, 1996.
[51] Int. Cl.$^6$ ............................................. B63B 39/03
[52] U.S. Cl. ................................................ 114/125
[58] Field of Search ........................ 114/125; 440/82

[56] References Cited

U.S. PATENT DOCUMENTS 4,269,599  5/1981  Zhestkov et al. .................... 114/125

OTHER PUBLICATIONS

BHP Research paper entitled "Shipping Ballast Water–Heating as a Means of Destroying Potentially Harmful Marine Organisms" by Dr. Geoff Rigby and Alan Taylor—dated Jun. 1993 (8 pages).

Can. J. Fish. Aquat. Sci., vol. 50, 1993 (pp. 2086–2093)—Title: "Ballast Water Exchange as a Means of Controlling Dispersal of Freshwater Organisms by Ships" by A. Locke, D.M. Reid, H.C. van Leeuwen, W.G. Sprules and J.T. Carlton.

Can. Tech. Rep. Fish. Aquat. Sci. 1822—Abstract and pp. 42–43 by A. Locke, D.M. Reid, W.G. Sprules, J.T. Carlton and H.C. van Leeuwen—1991—"Effectiveness of mid–ocean exchange in controlling freshwater and coastal zooplankton in ballast water".

Science, vol. 261—Jul. 2, 1993 (pp. 34–35)—Article entitled "Foreign Invaders" by Joel W. Hedgpeth.

Science, vol. 261—Jul. 2, 1993 (pp.78–82)—Article entitled "Ecological Roulette: The Global Transport of Nonindigenous Marine Oranisms" by James T. Carlton and Jonathan B. Geller.

Article from the Chicago Tribune dated Jan. 4, 1995—p. 1—"Rising tide of invaders spills into Great Lakes" by William Mullen.

Focus 10,000—Jul. 1993(pp. 12–15) Article entitled "Ballast Water Exchange" by Marcia Baer.

Principles of Naval Architecture—Volume One—written by a "Group of Authorities" dated 1942—Title page and pp. 88–97, 99–101, 144–146, 204–212.

Design and Construction of Steel Merchant Ships—written by a "Group of Authorities" dated 1955—Title page and pp. 51–55.

*Primary Examiner*—Sherman Basinger
*Attorney, Agent, or Firm*—Trask, Britt & Rossa

[57] ABSTRACT

A ballast water treatment system has a source of hot water from the cooling water overboard discharge associated with the propulsion plant of a cargo or ship vessel. The heat exchangers are placed to receive ballast water from ballast tanks or in ballast tanks. A hot fluid system takes the heat from the overboard discharge and uses it to heat the ballast water as it is pumped through the heat exchangers.

17 Claims, 3 Drawing Sheets

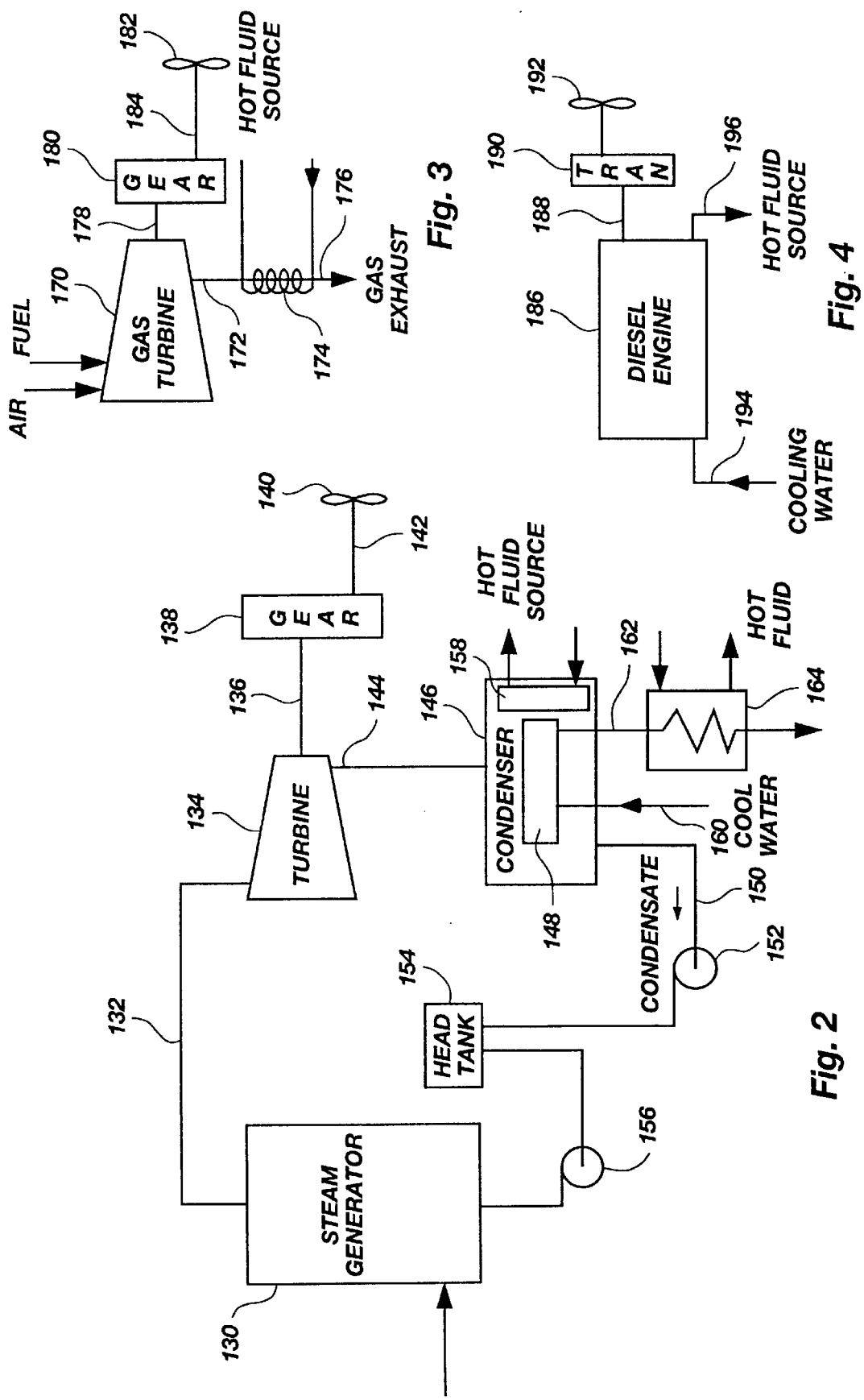

BALLAST WATER TREATMENT SYSTEM

This application claims the benefit of U.S. Provisional application Ser. No. 60/011,673 filed Feb. 14, 1996.

BACKGROUND OF THE INVENTION

1. Field of the Invention

This application relates to systems for heating the ballast water of a ship.

2. State of the Art

Cargo vessels that are used for moving freight over water typically have a plurality of tanks that are used to retain fluids including ballast water. Ballast in the form of water is taken on as necessary to maintain the ship on an even keel and to control the center of buoyancy relative to the metacenter of the cargo vessel. Reference may be had to *Principles of Naval Architecture*, Vol. 1, written by H. E. Rossell and L. V. Chapman, published by the Society of Naval Architects and Marine Engineers (New York 1942), at pages 88, regarding ballast water tanks, fuel tanks, and the like. There is also discussion of the center of buoyancy relative to the metacenter of a ship and the various factors relating to the ability of a ship to right itself when it rolls or is otherwise not on an even keel. Discussion is also had about steps to maintain the ship on an even keel by use of systems to trim the vessel by moving water between or in and out of various ballast tanks. Reference may be also had to *Design and Construction of Steel Merchant Ships*, edited by D. Arnott, published by the Society of Naval Architects and Marine Engineers (New York 1955).

Other vessels, in addition to cargo vessels, may use ballast water from time to time. For example, barges, passenger ships, naval ships, and the like may use ballast water to maintain an even keel when loads or cargo are taken on or removed from time to time and to offset the changes evolving from the use of fresh water, stores, fuel and the like.

Vessels that take on ballast water into various ballast tanks do so by accepting water or taking water from the environs in which they are at the time it is needed. Thus, a vessel off-loading freight in a port may from time to time take on ballast water while tied to a pier or moored in that port.

It is recognized that vessels taking on ballast water acquire in that ballast water local algae, zooplankton and other organisms that are extant in that particular locale. When the vessel moves to another port and takes on cargo or other loads, ballast water may be removed, thus delivering the algae, zooplankton and other organisms to the port (or other location) in which the vessel is then located. As a result, it is recognized that cargo vessels have been creating environmental problems by transporting various algae, zooplankton and organisms from one port to another. In order to control or minimize such transport in ballast water, vessels are requested to exchange harbor ballast water for open ocean water in order to control dispersal of fresh water organisms or organisms more locally oriented and found in ports that are not found in the open ocean environment. See A. Locke, D. Reid, H. van Leeuwen, W. Sprules, and J. Carlton, *Ballast Water Exchange as a Means of Controlling Dispersal of Fresh Water Organisms by Ships* (Can. J. Fish. Aquat. Sci. Vol. 50, 1993), at page 2086.

It is understood that ballast water exchange, to the extent it is presently practiced, is not entirely effective. Some organisms can be retained within an empty ballast water tank for an extended period of time. Further, an exchange with open ocean salt water does not necessarily remove or eliminate all of the acquired organisms. Of course, many ships may not practice ballast water exchange as requested.

Systems to eliminate organisms obtained in ports while loading or unloading cargo are desirable in order to minimize the increasing risk of environmental pollution.

SUMMARY

A system is provided by which the waste energy from the propulsion system of a vessel in the form of heat transferred to a heating fluid such as water is used to heat the ballast water and, in effect, pasteurize the ballast water to eliminate the microorganisms and other living creatures that may have entered or been entrained as the ballast water was taken on. The system includes a source and a supply of heating fluid that employ a plurality of valves in which the hot or heating fluid (such as water) is delivered to an inlet of a selected heat exchanger from the hot or heating fluid source. The hot or heating fluid source is preferably structured to extract heat from the system used to remove excess heat energy from the propulsion system of the vessel. In the absence of useful energy from the cooling water or if the energy from the cooling water is insufficient, an auxiliary source of energy, such as a boiler or heater, may be used as the hot fluid source.

The water from the ballast tank may be pumped to one or more heat exchangers and returned to the ballast tank through a return after being heated to a desired temperature. Alternately, a heat exchanger may be placed in a ballast tank. The hot or heating fluid may be delivered to the heat exchanger in the ballast tank in order to raise the temperature of the ballast water in that tank. The heat exchanger is connected to the return so that the heating fluid can be transported to the heating fluid source.

BRIEF DESCRIPTION OF THE DRAWINGS

FIG. 2 shows a conventional steam system and the location in that steam system of a hot fluid source.

FIG. 3 is a gas turbine propulsion system with a hot fluid source.

FIG. 4 shows a diesel propulsion system with a hot fluid source for use with a system of FIG. 1.

DETAILED DESCRIPTION OF THE ILLUSTRATED EMBODIMENT

Figure 1:
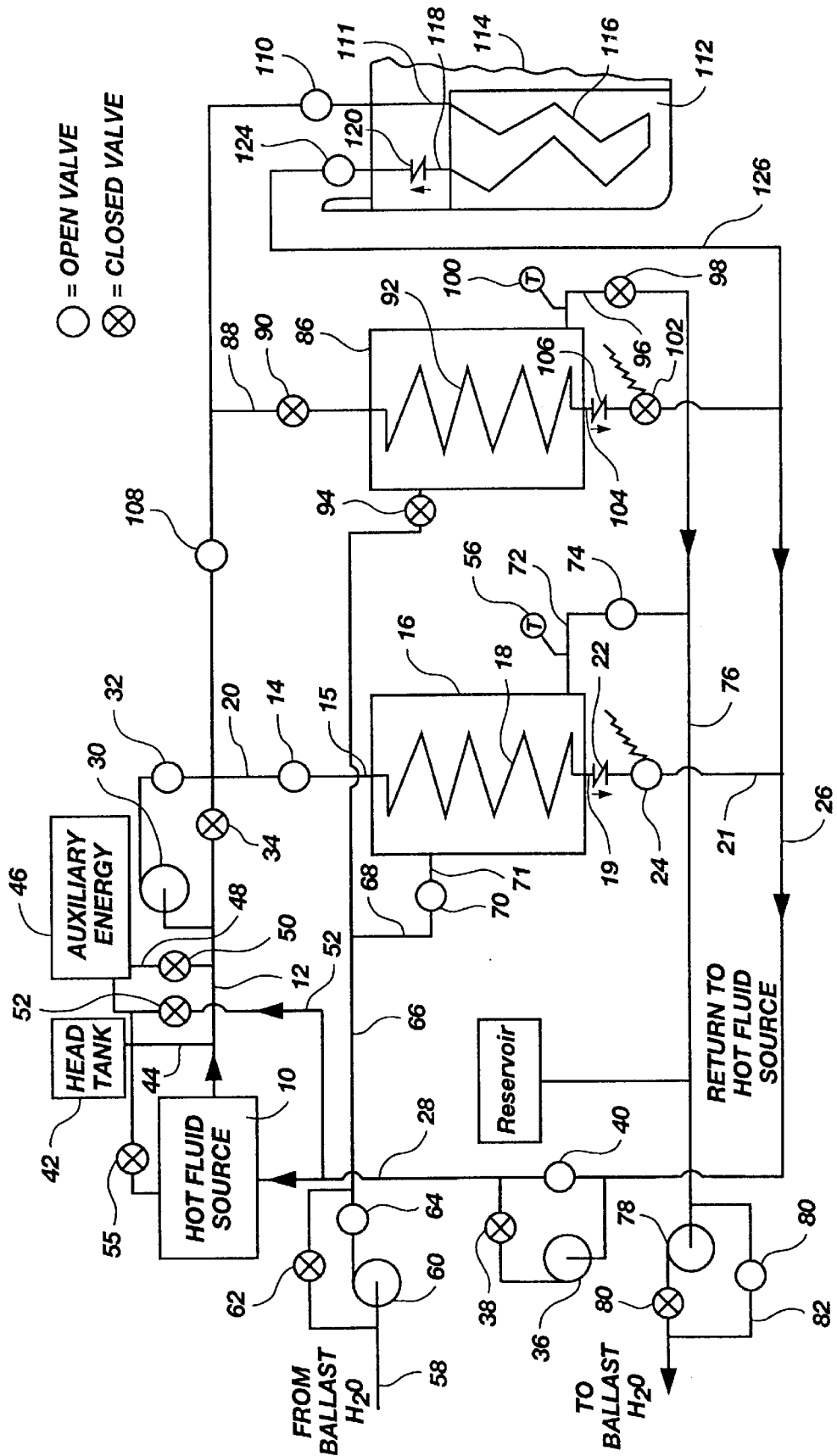
FIG. 1 shows a ballast water treatment system of the present invention.
Figure 6:
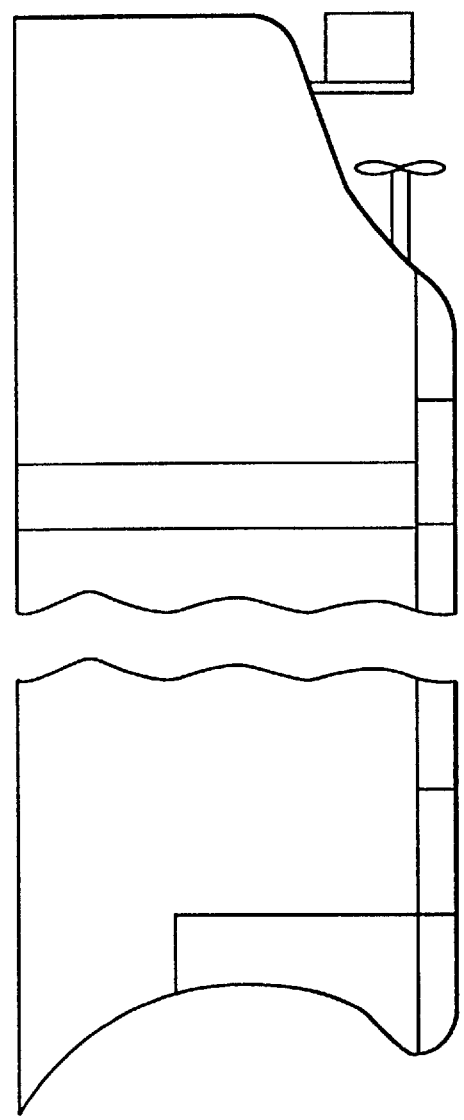
FIG. 6 is a partial, simplified, cross-sectional side view depicting a cargo vessel.
Figure 5:
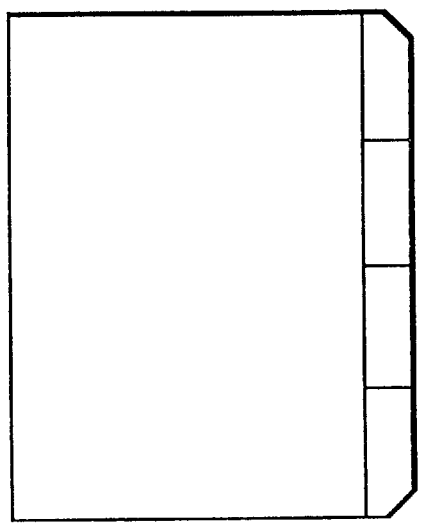
FIG. 5 is a cross-sectional view of a simplified cargo vessel with ballast tanks.

In reference to FIG. 1, the hot or heating fluid source 10 is shown interconnected to a hot or heating fluid header 12 or supply through a valve 14 to the inlet 15 of a heat exchanger 16. The heat exchanger 16 is shown as a sealed vessel with heat exchanging tubes 18 positioned therein. The heat exchanger 16 may be of the counterflow, cross-flow, or back-flow variety as desired in given applications.

The valve 14 may be any conventional stop valve such as a ball valve or gate valve. The valve typically has a closed position represented by an "X" and then an open position, which is represented by the absence of an "X." That is, the valve 14 is here shown as a simple circle to reflect that it is open so that hot fluid from the source 10 is proceeding through the header 12 and the distribution line 20 to the heat exchanger 16. As stated, the hot or heating fluid passes through the heat exchanger coils 18, through the outlet 19 and then to the discharge 21 through a discharge check valve 22 positioned to prevent back-flow into the heat exchanger 16. The heating fluid (now cooler) then proceeds through a thermostatically controlled solenoid valve 24 to a heating fluid return which includes return header 26 and then via a return line 28 to the fluid source 10, where it is processed to acquire more heat for redelivery through the heat exchanger 16.

As can be seen in FIG. 1, a supply pump 30 may be provided in order to provide the hot or heating fluid at a desired flow rate and pressure. A pump isolation valve 32 is shown with a bypass valve 34 now closed (as represented by the X in the circle) to show that the hot fluid from the hot fluid source is supplied in the header 12 under pressure through valve 14 and through the heat exchanger 16 to the return header 26.

A separate booster pump or return pump 36 may be used together with the supply pump 30 or as the system pump without the supply line pump 30. The pump 36 may place a pressure on the system containing the hot or heating fluid as well as the return so that a pump such as pump 30 in the supply side is not necessary. As here shown, the return pump 36 is not operating with its discharge valve 38 closed. The bypass valve 40 is open.

It may also be seen that a head tank 42 has been connected via a line 44 to the header 12. The head tank 42 is typically vented to the atmosphere and is provided to regulate the pressure of the heating fluid in the header 12. A pressure above that provided by atmosphere may be desired in order to increase the temperature of the hot or heating fluid source above the boiling point of the fluid to permit greater increases in the enthalpy of the fluid and in turn greater increases in the amount of heat energy being delivered to the ballast water.

An auxiliary energy source 46 is also shown. The auxiliary energy source may be a simple fossil fuel boiler or heater configured to supply fluid through a discharge valve 50 to the supply header 12. The auxiliary energy source may receive heating fluid from the return line 28 and a separate return line 52 via supply valve 54 or from the heating fluid source 10 via valve 55. The auxiliary energy source 46 may thus be operated as an alternate source of heating fluid or in series with the heating fluid source 10 to further increase the heat delivered to the heating fluid and in turn to the heat exchanger 16.

It has been stated before that the valve 24 on the discharge of the heat exchanger is a thermostatically controlled solenoid valve. That is, the valve 24 may be of the type in which the flow rate of fluid through it is regulated by the temperature sensed by a temperature sensor 56 positioned in the discharge line 72 of the ballast water.

As can be seen, ballast water may be supplied from a source thereof such as a ballast tank via a supply that includes an input line 58 and a supply pump 60. The input line 58 may be connected to a fluid system used for taking on and transferring ballast water. It may also be connected to the fuel system if the fuel system takes on compensating water to compensate for spent fuel.

The supply pump has a bypass 62, which is here shown to be closed, and a discharge valve 64, which is shown open. The ballast water is then supplied via the supply header 66 to a heat exchanger supply line 68. The heat exchanger supply line 68 has an inlet control valve 70, which is here shown to be open. The ballast water then passes from an inlet 71 through the heat exchanger to an outlet 72. The outlet 72 has a discharge stop valve 74 as well as a temperature sensor 56 as hereinbefore noted. The discharge stop valve 74 allows the ballast water to return via a return header 76 to a return pump 78.

The pump 78 has a discharge valve 80, which is here shown to be closed. Bypass valve 80 opens to reflect the fact that the ballast water passes around the pump 78 via the bypass line 82. A supply pump 60 may supply sufficient head to cause the ballast water to flow through the heat exchanger and back to the source of ballast water such as the ballast tank. Alternatively, return pump 78 may be used in lieu of a supply pump 60. In some applications, both a supply pump 60 and a return pump 78 will be necessary.

FIG. 1 also shows a second heat exchanger 86, which is connected to the source of hot or heating fluid 10 via line 12 and line 88 via supply valve 90. The supply valve 90 is here shown closed to reflect the fact that the heat exchanger 86 is not "on line" and not in fact operating. The heat exchanger 86 is here shown to also have a plurality of interior tubes 92 over or about which ballast water flows in order to extract the heat and increase in temperature. That is, the ballast water may be supplied via the supply header 66 and supply valve 94. The outlet 96 has a discharge stop valve 98 as well as a temperature sensor 100 connected to the discharge solenoid valve 102 in a manner comparable to that of heat exchanger 16. The discharge of hot or heating fluid from the heat exchanger 86 is effected through a discharge line 104 and a discharge check valve 106 into the hot or heating fluid return header 26. The discharge valve 102 is shown in a closed condition to prevent back-flow as well as to isolate the heat exchanger as desired.

In operation, it can be seen that hot or heating fluid from the hot or heating fluid source 10 passes through the hot or heating fluid header 12 and supply pump 30. Hot or heating fluid then passes through valve 14 and through heat exchanger 16 and the interior tubes thereof 18. The rate of flow is regulated by the discharge solenoid valve 24 based on the temperature sensed in the discharge of the ballast water 56. Although temperature control is here suggested, it is not required and may not be necessary if the user operates the system as a circulating system in which the temperature rises gradually as ballast water is circulated through the heat exchanger 16.

The second heat exchanger 86 represents a second or, in turn, a plurality of additional heat exchangers which may be used at a different location(s) as desired, based on the particular vessel and location at hand.

FIG. 1 also shows a heat exchanger being positioned within a ballast tank. More specifically, the hot or heating fluid may be supplied via the header 12 through an isolation valve 108 and a supply valve 110 into a ballast tank 112 of a ship or cargo vessel 114. The heat exchanger consists of an inlet 111 and a plurality of tubes 116 positioned within the ballast tank 112. The hot or heating fluid leaves the heat exchanger 116 via the outlet or discharge line 118 and a discharge check valve 120. A discharge stop valve 124 is also provided. The hot or heating fluid then returns via a return line 126 to the return header 26 for further transport to the source 10 for reheating.

FIG. 2 shows a simplified steam propulsion system in which a steam generator 130 is provided to supply steam via a steam header 132 to a propulsion turbine 134. The propulsion turbine 134 supplies rotational torque via a shaft 136 to a reduction gear 138. The reduction gear 138 in turn powers the propeller 140 via a propeller shaft 142. The steam exiting the turbine via line 144 passes into a condenser 146. In traditional steam systems, the condenser acquires seawater through an induction and a discharge. The seawater passes through a bundle of tubes 148 over which the steam is projected to condense the steam. The steam in the form of condensate is transported via a condensate line 150 by a condensate pump 152 to head tank 154 or a de-aerating feed tank as appropriate for the system. It may also pass directly to the main feed pump 156 for further delivery to the steam generator 130. Fuel and air may be supplied to the steam generator for combustion. Alternately, hot water may be supplied in a nuclear propulsion system.

A fluid source 10 in FIG. 1 may, in fact, be a separate heat transfer means such as heat exchanger or tube bundle 158 positioned within the condenser in order to receive return hot or heating fluid and act as a supply of hot or heating fluid for delivery to the supply header 12 in FIG. 1. The seawater, which enters via the induction 160 and leaves via a seawater overboard 162, may pass through a separate heat exchanger 164 before passing overboard. The heat exchanger 164 receives the return of the hot or heating fluid via return line 28 and supplies the hot or heating fluid to the supply header 12.

In FIG. 3, a gas turbine propulsion system is shown in which air and fuel are supplied to a gas turbine 170. The gas turbine burns the fuel/air mix, driving the turbine and producing a gas exhaust which is supplied via an exhaust line 172. A heat exchanger 174 which functions as a transfer means to transfer heat is positioned in or about the gas exhaust in order to heat the returned hot or heating fluid received via line 28 (FIG. 1) and acts as a hot or heating fluid source for the supply header 12. The gas is further exhausted via appropriate stack 176. The gas turbine, of course, drives a shaft 178, which turns a reduction gear 180. The reduction gear 180 drives a propeller 182 via a propeller shaft 184.

In FIG. 4, an engine 186 is shown which supplies shaft horsepower via output shaft 188 typically to a transmission 190 for further delivery of rotational or shaft horsepower to a propeller 192. The engine 186 is configured to have cooling water pass through jackets positioned about the cylinders to remove excess energy. The cooling water is supplied via an inlet line 194 through the cylinder jackets of the engine 186. The cooling water may be discharged directly into header 12 so that the diesel engine acts as a source of hot fluid. Alternatively, the cooling water discharge line 196 may pass through a heat exchanger or heat transfer means comparable to heat exchanger 164. The heat exchanger in turn may receive the return fluid via line 28 and supply hot or heating fluid to the supply header 12.

It may be recognized that other propulsion systems may be used in a variety of different configurations. However, any propulsion system that uses fuel will produce excess energy which is typically discharged by a cooling water system. The energy is recovered from the cooling water system to heat the ballast water to a desired temperature.

For example, for a ship delivering 17,500 shaft horsepower, approximately one-third of the total energy available to create that shaft horsepower is discharged in the form of heat. The ballast water system of the present invention seeks to capture a portion of the discharged heat in order to heat the ballast water to in turn kill the microorganisms and the other living things in the ballast water by raising the temperature to a point that the water no longer supports the organisms and other living things. For the 17,500 shaft horsepower ship, approximately 14,691,600 btu's per hour will be available from the discharge of the cooling water. If a ship had 13,400 tons of ballast water, the system would be able to raise the ballast water temperature approximately one-half degree per hour in ideal conditions. However, some energy is lost to ambient. Further, the heat exchangers which act as the hot fluid source are also less than 100% efficient. In turn, the temperature rise may be as little as 0.2° per hour or approximately 4½° to 5° F. per day for a system configured to heat all the water at once. This is a worst case scenario in that it presupposes that the ship is carrying no cargo, and that it is carrying its entire payload capacity as ballast.

Under certain intended uses, it may be desirable to increase the heating rate. In these cases, it would be appropriate to add the earlier mentioned auxiliary source of heat, such as a boiler, which could use the same fuel as the main propulsion system.

Other systems may be configured to heat one tank at a time or even a portion of one tank at a time. Further other systems may take ballast from one full tank, heat it and return it to an empty ballast tank.

What is claimed is:

1. A ballast water treatment system comprising:
  a source of hot fluid;
  a ballast tank with ballast water configured to be a source of ballast water;
  a heat exchanger connected to said source of hot fluid to receive said hot fluid and to pass said hot fluid there through to a discharge connected to return said hot fluid to the source of hot fluid, said heat exchanger also being connected to said source of ballast water to receive ballast water and extract heat from the hot fluid to heat the ballast water and supply it to a discharge connected to said source of ballast water, said heat exchanger being positioned within said ballast tank and configured to transfer heat substantially entirely to said ballast water.

2. A ballast water treatment system comprising:
  a source of ballast water;
  a source of heating fluid that is elevated in temperature relative to said ballast water;
  a heating fluid supply connected to said source of heating fluid and configured to be closed and transport said heating fluid;
  pressure means connected to said heating fluid supply to pressurize said heating fluid in said heating fluid supply to a selected pressure;
  a heat exchanger having a heating fluid inlet connected to said heating fluid supply to receive said heating fluid therefrom and a heating fluid outlet connected to discharge said heating fluid, said heat exchanger having structure connected between said heating fluid inlet and said heating fluid outlet to be in contact with the ballast water from said source of ballast water, said heat exchanger being configured to pass said heating fluid relative to said ballast water to transfer heat from the heating fluid to said ballast water; and
  a heating fluid return connected to said heating fluid outlet to receive said heating fluid and to said source of heating fluid for returning said heating fluid thereto, said heating fluid return being configured for transporting said heating fluid from said heating fluid outlet to said source of heating fluid.

3. The system of claim 2 further including a ballast water supply connected to said source of ballast water and configured to transport ballast water and a ballast water return connected to said ballast water source and configured to transport ballast water thereto, and wherein said heat exchanger has a ballast water inlet connected to said ballast water supply to receive ballast water therefrom and a ballast water outlet connected to said ballast water return to supply ballast water thereto.

4. The system of claim 3 wherein said pressure means includes a head tank connected to be in fluid communication with said heating fluid supply to pressurize said heating fluid supply to a preselected pressure.

5. The system of claim 3 wherein said pressure means of said heating fluid supply includes first pumping means for urging said heating fluid under pressure from said source of heating fluid to said heat exchanger.

6. The system of claim wherein said ballast water return includes means to maintain said ballast water under pressure.

7. The system of claim 5 wherein said ballast water supply includes second pumping means for urging said ballast water from said source of ballast water to said heat exchanger.

8. The system of claim 7 wherein said source of ballast water is a ballast tank on an afloat vessel.

9. The system of claim 7 wherein said source of heating fluid includes transfer means for transferring heat to said heating fluid from the waste heat of the propulsion system of an afloat vessel.

10. The system of claim 9 wherein said propulsion system of an afloat vessel is a steam propulsion system having a condenser to condense steam, said condenser being connected to receive cooling water to condense said steam, and wherein said transfer means is positioned in said condenser.

11. The system of claim 9 wherein said propulsion system of an afloat vessel includes a diesel engine with a cooling water system, and wherein said transfer means is said diesel engine and said cooling water system.

12. The system of claim 9 wherein said propulsion system for an afloat vessel is a gas turbine system with exhaust gases, and wherein said transfer means is positioned to receive heat from said exhaust gases.

13. The system of claim 3 further including auxiliary energy means for supplying heat energy to said heating fluid, said auxiliary energy means being connectable to said heating fluid supply and operable to heat said heating fluid to a temperature above the elevated temperature of the heating fluid of said source of heating fluid.

14. The system of claim 3, wherein said source of ballast water is a ballast tank and wherein said heat exchanger is positioned substantially entirely in said ballast tank.

15. A method of treating ballast water to remove living organisms therefrom, said method comprising:
providing a source of ballast water;
providing a ballast water supply configured to transport said ballast water;
connecting said ballast water supply to said source of ballast water;
providing a source of heating fluid that is elevated in temperature relative to said ballast water;
providing a heating fluid supply configured to transport said heating fluid;
providing a pressure means for communicating a static pressure to said heating fluid;
connecting said heating fluid supply to said source of heating fluid;
providing a heat exchanger having a heating fluid inlet to receive said heating fluid under pressure, a heating fluid outlet to discharge said heating fluid, a ballast water inlet to receive said ballast water, a ballast water outlet to discharge said ballast water, said heat exchanger being configured to pass said heating fluid and said ballast water there through oriented relative to each other to transfer heat from one to the other;
connecting said heating fluid inlet to said heating fluid supply to receive said heating fluid therefrom;
connecting said pressure means to said heating fluid supply to supply said static pressure to said heating fluid;
connecting said ballast water inlet to said ballast water supply to receive ballast water therefrom;
providing a heating fluid return to transport said heating fluid from said heat exchanger to said source of heating fluid;
providing a ballast water return to transport said ballast water from said heat exchanger to said source of ballast water;
connecting said heating fluid return to said heating fluid outlet to receive said heating fluid and to said source of heating fluid for returning said heating fluid thereto;
connecting said ballast water return to said ballast water outlet to receive said ballast water and to said source of ballast water for returning said ballast water thereto;
causing heating fluid under said static pressure to pass from said source of heating fluid, through said heating fluid supply, through said heat exchanger and through said heating fluid return to said source of heating fluid, and causing ballast water to pass from said source of ballast water, through said ballast water supply, through said heat exchanger, through said ballast water return to said ballast water supply to transfer heat from said heating fluid to said ballast water.

16. The method of claim 15 further comprising:
providing an auxiliary energy source for heating said heating fluid above said elevated temperature;
connecting said auxiliary energy source to one of said heating fluid source and said heating fluid return to receive heating fluid therefrom;
connecting said auxiliary energy source to said heating fluid supply for supplying heating fluid thereto above said elevated temperature; and
operating said auxiliary energy source to heat said heating fluid above said elevated temperature.

17. A ballast water treatment system comprising:
a source of ballast water;
a source of heating fluid that is elevated in temperature relative to said ballast water;
auxiliary energy means for supplying heat energy to said heating fluid, said auxiliary energy means connected to said heating fluid supply and operable to heat said heating fluid to a temperature above the elevated temperature of the heating fluid of said source of heating fluid;
a heating fluid supply connected to said source of heating fluid and configured to transport said heating fluid;
pressure means connected to said heating fluid supply to pressurize said heating fluid in said heating fluid supply to a selected pressure, said pressure means including a head tank connected to said fluid supply to communicated a desired static pressure to said heating fluid;
a heat exchanger having a heating fluid inlet connected to said heating fluid supply to receive said heating fluid therefrom and a heating fluid outlet connected to discharge said heating fluid, said heat exchanger having structure connected between said heating fluid inlet and said heating fluid outlet to be in contact with the ballast water from said source of ballast water, said heat exchanger being configured to pass said heating fluid relative to said ballast water to transfer heat from the heating fluid to said ballast water; and a heating fluid return connected to said heating fluid outlet to receive said heating fluid and to said source of heating fluid for returning said heating fluid thereto, said heating fluid return being configured for transporting said heating fluid from said heating fluid outlet to said source of heating fluid.

* * * * *